United States Patent [19]

Tsujino et al.

[11] 4,172,114
[45] Oct. 23, 1979

[54] METHOD FOR PURIFYING PLUTONIUM HEXAFLUORIDE

[75] Inventors: Takeshi Tsujino; Mitsuhiro Nishimura; Kazunobu Yamazaki; Susumu Sugikawa, all of Ibaraki, Japan

[73] Assignee: Japan Atomic Energy Research Institute, Tokyo, Japan

[21] Appl. No.: 827,257

[22] Filed: Aug. 24, 1977

[30] Foreign Application Priority Data

Sep. 3, 1976 [JP] Japan .................. 51-104979

[51] Int. Cl.$^2$ ............................................. C01G 56/00
[52] U.S. Cl. .......................................... 423/19; 55/71; 55/72; 423/251
[58] Field of Search .............. 423/19, 251; 55/71, 55/72, 74

[56] References Cited

U.S. PATENT DOCUMENTS

| 3,165,376 | 1/1965 | Golliner | 55/71 |
| 3,178,258 | 4/1965 | Cathers et al. | 55/71 |
| 3,294,493 | 12/1966 | Jonke et al. | 423/251 |
| 3,423,190 | 1/1969 | Steindler et al. | 423/251 |
| 3,625,661 | 12/1971 | Anderson et al. | 55/72 |

Primary Examiner—Edward A. Miller
Attorney, Agent, or Firm—Oblon, Fisher, Spivak, McClelland & Maier

[57] ABSTRACT

An effective method for purifying plutonium hexafluoride for the reprocessing of the spent nuclear fuel or for the recovery of fuel plutonium from the scrap by fluoride-volatility with high decontamination factors is presented using a selective adsorption of the fission products fluorides by letting the gas mixture flow through a layer of an adsorbent consisting of one or more of the specified compounds selected from hexafluoro sodium aluminate, zinc fluoride, nickel fluoride and ferric fluoride at an elevated temperature. The principle of the purification method is based on the fact that the fluorides of the fission products are easily adsorbed by the adsorbent but little plutonium hexafluoride is adsorbed. The fluorides of the fission products are easily removed from the adsorbent by heating and the recycling use of the adsorbent is possible.

2 Claims, No Drawings

METHOD FOR PURIFYING PLUTONIUM HEXAFLUORIDE

BACKGROUND OF THE INVENTION

1. Field of the Invention

The present invention relates to a method of purifying plutonium hexafluoride in the reprocessing of the spent nuclear fuel or in the recovery of fuel plutonium from the scrap using fluoride-volatility by letting the gases of fluorides flow through a layer of an adsorbent.

2. Description of the Prior Art

Heretofore several proposals and studies have been made for purifying of plutonium hexafluoride. They include the methods of the selective condensation of fission products, the thermal decomposition, and the chemical reduction of plutonium fluorides and the like. However, these method give low decontamination factors for the fluorides of the fission products without exception and they are not considered as the established methods for purifying plutonium hexafluoride. Furthermore, another method for purifying plutonium hexafluoride by adsorption-desorption using lithium fluoride as the adsorbent for plutonium hexafluoride has been proposed but with low yield of the recovered plutonium. After all, there is no effective method for purifying plutonium hexafluoride and the manufacturing process for the nuclear fuel does not include any specified purification step for plutonium hexafluoride in the present time. Thus, development of an effective method for purifying plutonium hexafluoride has been long-awaited.

SUMMARY OF THE INVENTION

The object of the present invention is to provide a method for purifying plutonium hexafluoride by fluoride-volatility in the course of the reprocessing of the spent nuclear fuel or the recovery of fuel plutonium from the scrap. This object is easily attained by letting the gases of the fluorides of the nuclear fission products and/or the mixed gas of plutonium hexafluoride and the fluorides of the impurities flow through a heated layer of an adsorbent consisting of one compound or a mixture of two or more of compounds selected from hexafluore sodium aluminate, zinc fluoride, nickel fluoride and ferric fluoride.

DETAILED DESCRIPTION OF THE PREFERRED EMBODIMENTS

The present invention relates to a method for purifying plutonium hexafluoride. Particularly, the invention relates to a method for purifying plutonium hexafluoride (hereinafter denoted as "$PuF_6$") by fluoride-volatility in the reprocessing of the spent nuclear fuel or in the recovery of fuel plutonium from the scrap. The object of the purification of $PuF_6$ by fluoride-volatility is to separate the fluorides of the nuclear fission products (hereinafter denoted as "$FPs_xF_y$") such as the fluorides of niobium, antimony, ruthenium and the like accompanying plutonium hexafluoride or the fluorides of the impurities in the scrap. The reprocessing of the spent nuclear fuel is very important in order to operate the re-fabrication smoothly or to make repeated use of plutonium.

The purification process of uranium hexafluoride ($UF_6$) is already established and actually proofed by the adsorption-desorption method using sodium fluoride as the adsorbent or by the fractional distillation of impure $UF_6$ since $UF_6$ is thermodynamically stable. However, $PuF_6$ cannot be purified by such methods similar to the case of $UF_6$ because of the thermodynamical instability of $PuF_6$ as compared with $UF_6$ and the chemical properties of $PuF_6$ resembling $FPsxFy$.

The object of the present invention is to provide an effective and simplified method for purifying $PuF_6$ by selective adsorption of $FPs_xF_y$ and letting $PuF_6$ to be recovered flow through an adsorption column in the course of the reprocessing of the spent nuclear fuel or in the recovering process of the fuel plutonium from the scrap.

The inventors have accomplished the present invention by the process-experiments and the theoretical analyses following to the finding of the fact that specified adsorbents can selectively react on $FPsxFy$ or fluorides of impurities contained in the scrap of plutonium such as niobium pentafluoride ($NbF_5$), antimony pentafluoride ($SbF_5$), ruthenium pentafluoride ($RuF_5$), molybdenum pentafluoride ($MoF_5$), tungsten hexafluoride ($WF_6$), vanadium pentafluoride ($VF_5$), titanium tetrafluoride ($TiF_4$) and the like in the research and development works for the reprocessing of the nuclear fuel by fluoride-volatility. The specified adsorbents include hexafluoro sodium aluminate (cryolite, $Na_3AlF_6$), zinc fluoride ($ZnF_2$), nickel fluoride ($NiF_2$) and ferric fluoride ($FeF_3$).

The method of the present invention can be applied to the reprocessing of the spent nuclear fuel to recover and purify plutonium as the nuclear fuel taking advantage of the character of the fluoride such as the volatility and in the recovery and purification of $PuF_6$ by fluoride-volatility starting from the scrap of the fuel plutonium containing impurities such as FPs (fission products).

In the purification method for plutonium hexafluoride according to the present invention, the selective removal of $FPsxFy$ such as niobium pentafluoride or the fluorides of the impurities such as vanadium pentafluoride from $PuF_6$ is carried out by letting the $PuF_6$ gas containing such impurities flow through a layer of a specific adsorbent at an elevated temperature in the range of from 100° C. to 250° C. to form a double salt of $FPs_xF_y$ or the fluoride of the impurities combined with the adsorbent. The purification of $PuF_6$ is easily attained by letting the gases flow through the layer of the adsorbent with little adsorption of $PuF_6$ by the adsorbent. Further, the adsorbent can be recycled in order to improve the recovering yield of plutonium by heating the adsorbent desorbing $FPsxFy$ or the like owing to the volatility of them. The useful adsorbent in the present invention is a compound or a mixture of two or more of compounds selected from a group consisting of hexafluoro sodium aluminate, zinc fluoride, nickel fluoride and ferric fluoride.

The principle of such a separation process with selective adsorption by these adsorbents is based on the fact that $FPsxFy$ or the fluorides of the impurities easily form a complex compound by the reaction with the adsorbent and the fact that $PuF_6$ hardly forms a complex compound by the reaction with the adsorbent.

The purification of $PuF_6$ which is hitherto hardly attainable is realized by the present invention with a concise operation, that is, with selective adsorption of $FPsxFy$ or the fluorides of the impurities. The purified $PuF_6$ is easily manufactured using a processing equipment comprising a fluorination column for plutonium connected with a heated trap for adsorption. Therefore, the method for purifying $PuF_6$ according to the present invention is extremely simple and has several advantages over the methods heretofore proposed such as the elimination of the use of the excessive amount of the reducing gas or the elimination of the troublesome problems including the treatment of powdery materials in the operation. In addition, plutonium is purified with a higher recovering yield as compared with the purification methods comprising the adsorption process for $PuF_6$ because of the elimination of the desorption step.

As explained in the above, an effective method for purifying $PuF_6$ is provided by the present invention and the operations in the processing are noticeably simplified, while hitherto no effective method for purifying $PuF_6$ has been established.

The purification method for plutonium hexafluoride by the present invention is further explained in detail by the following examples.

EXAMPLE 1 TO EXAMPLE 4

A mixed gas of $PuF_6$ and $FPs_xF_y$ was let flow at 100° C. through an adsorbing layer of 2 cm in thickness in a trap packed with powdered cryolite ($Na_3AlF_6$, 100 to 300 mesh) (in Example 1) with a linear velocity of 0.7 cm/sec. for five hours. The mixed gas contained 1 vol. % of $PuF_6$, 1 vol. % of $NbF_5$, 1 vol. % of $SbF_5$, 0.5 vol. % of $RuF_5$ and 20 vol. % of $F_2$ incorporated in nitrogen gas as the carrier.

Similarly, additional experiments were carried out using powdery zinc fluoride ($ZnF_2$, in Example 2), powdery nickel fluoride ($NiF_2$, in Example 3) and powdery ferric fluoride ($FeF_3$, in Example 4) as the adsorbents. Other processing conditions were same as in Example 1.

The amounts of the adsorbed $PuF_6$ and the fluorides of Nb, Sb and Ru are shown in the following Table 1.

Table 1

| The Amounts of the Adsorbed $PuF_6$ and $FP_xF_y$ at 100° C. (g metal/g adsorbent | | | | |
|---|---|---|---|---|
| Example Nos. | Adsorbent | \multicolumn{4}{c}{Adsorbed Fluorides} |
| | | $PuF_6$ | $NbF_5$ | $SbF_5$ | $RuF_5$ |
| 1 | $Na_3AlF_6$ | 0.003 | 0.05 | 0.15 | 0.08 |
| 2 | $ZnF_2$ | 0.003 | 0.05 | 0.03 | 0.01 |
| 3 | $NiF_2$ | 0.005 | 0.01 | 0.01 | 0.02 |
| 4 | $FeF_3$ | 0.011 | 0.02 | 0.05 | 0.02 |

EXAMPLE 5

An experiment similar to Example 1 was carried out but at a temperature of 150° C. The amount of the adsorbed $PuF_6$ was about 0.004 g Pu/g adsorbent and those of the fluorides of Nb, Sb and Ru were about 0.06, about 0.20 and about 0.08 g metal/g adsorbent, respectively.

EXAMPLE 6

A mixed gas of $PuF_6$ and $FPs_xF_y$ was let flow at 100° C. through a trap with an adsorbing layer of 15 cm in height consisting of powdered cryolite ($Na_3AlF_6$, 100 to 300 mesh) with a linear velocity of 0.8 cm/sec for 7 hours. The mixed gas contained 1 vol. % of $PuF_6$, 0.08 vol. % of $NbF_5$, 0.1 vol. % of $SbF_5$, 0.05 vol. % of $RuF_5$ and 20 to 50 vol. % of $F_2$ incorporated in nitrogen gas as the carrier. The decontamination factors of Nb, Sb and Ru were 80, 200 and 100, respectively.

EXAMPLE 7

An experiment similar to Example 6 was carried out but at a temperature of 150° C. The decontamination factors of Nb, Sb and Ru were increased to over 800, over $2 \times 10^3$ and over $10^3$, respectively.

EXAMPLE 8

An experiment similar to Example 6 was carried out but for the outlet gas of the fluorination bed for the core fuel simulated to the fast neutron reactor at a temperature of 150° C. The adsorption column for the experiment had an effective height of 20 cm and was packed with cylindrical pellets of cryolite each having a diameter of 7 mm and a height of 5 mm.

The decontamination factors of Nb, Sb and Ru for $PuF_6$ were about $4 \times 10^3$, about 110 and about 85, respectively.

EXAMPLE 9

An experiment for desorption of $FPs_xF_y$ adsorbed in cryolite used as the adsorbent in Example 5 was carried out by letting nitrogen gas flow through the adsorption column at 600° C. for 3 hours. The fractions of the evaporated $FPsxFy$ were 75%, 90% and 20% for $NbF_5$, $SbF_5$ and $RuF_5$, respectively.

EXAMPLE 10

An experiment similar to Example 7 was carried out for a mixed gas comprising 1 vol. % of $PuF_6$, 0.05 vol. % of $MoF_6$, 0.05 vol. % of $WF_6$, 0.05 vol. % of $VF_5$ and 0.05 vol. % of $TiF_4$.

The decontamination factors of Mo, W, V and Ti were about 200, about 500, about 800 and about 1000, respectively.

EXAMPLE 11

An experiment similar to Example 10 was carried out using nickel fluoride as the adsorbent. The decontamination factors of Mo, W, V and Ti were about 100, about 400, about 1000 and about 700, respectively.

What is claimed is:

1. In a process of purifying plutonium hexafluoride obtained in the reprocessing of spent nuclear fuel by selective adsorption of the volatile fluorides of the impurities, the improvement which comprises passing the mixture of plutonium hexafluoride containing the fluorides of the impurities through a layer of adsorbent selected from the group consisting of hexafluoro sodium aluminate, zinc fluoride, nickel fluoride, ferric fluoride and mixtures thereof, the adsorbent being maintained at a temperature of from 100° C. to about 250° C.

2. In the process of purifying plutonium hexafluoride obtained in the recovery of fuel plutonium from scrap by selective absorption of the volatile fluorides of the impurities, the improvement which comprises passing the mixture of plutonium hexafluoride containing the fluorides of the impurities through a layer of adsorbent selected from the group consisting of hexafluoro sodium aluminate, zinc fluoride, nickel fluoride, ferric fluoride and mixtures thereof, the adsorbent being maintained at a temperature of from 100° C. to about 250° C.

* * * * *